United States Patent
Fabregat

[11] 3,758,929
[45] Sept. 18, 1973

[54] MANUFACTURE OF A WIPING OR PISTON RING

[76] Inventor: Manuel Punsola Fabregat, Portola St., 14, P.O. Box 589, Barcelona, Spain

[22] Filed: Mar. 29, 1971

[21] Appl. No.: 129,017

[52] U.S. Cl............ 29/156.6, 29/156.61, 29/156.63, 72/352, 29/559
[51] Int. Cl............................................. B23p 15/06
[58] Field of Search................... 29/156.6, 156.61, 29/156.63, 557, 559; 72/352

[56] References Cited
UNITED STATES PATENTS

| | | | |
|---|---|---|---|
| 1,322,663 | 11/1919 | Wenzel | 29/1 |
| 1,392,027 | 9/1921 | Stoffers | 29/156.61 |
| 1,435,481 | 11/1922 | Kistner | 29/1 |
| 2,061,780 | 11/1936 | Short | 29/156.6 X |
| 2,132,197 | 10/1938 | Week, Jr. | 29/156.61 |

Primary Examiner—Charles W. Lanham
Assistant Examiner—Victor A. Di Palma
Attorney—Woodhams, Blanchard and Flynn

[57] ABSTRACT

This disclosure refers to improvements in the manufacture of a wiping ring comprising a grooved ring segment having an expander spring therein that presses radially all the exterior circumference of the segment against the wall of a surrounding cylinder and which radial pressure is graduated by the thickness and section of the expander. The segments are manufactured by compression, by means of a die-mold, the parts of which are partially or totally interchangeable.

8 Claims, 16 Drawing Figures

Inventor
MANUEL PUNSOLA FABREGAT

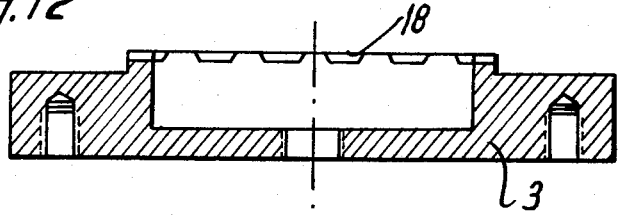
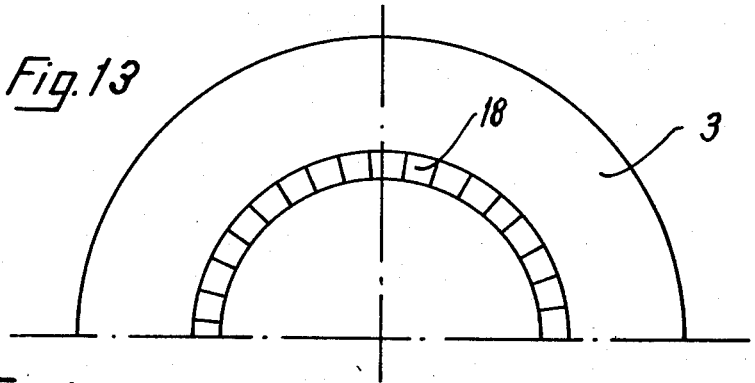
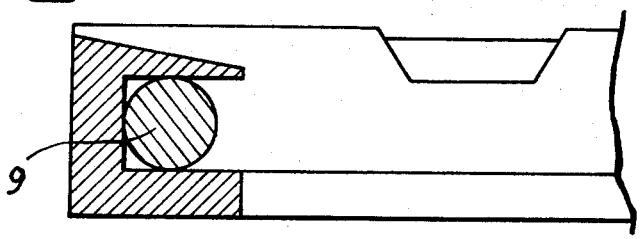
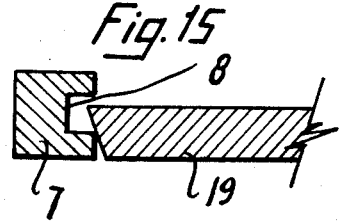
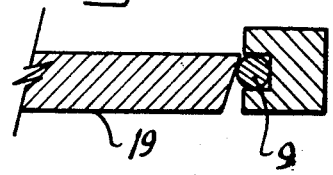
Inventor
MANUEL PUNSOLA FABREGAT

MANUFACTURE OF A WIPING OR PISTON RING

This invention refers to improvements in the manufacture of a ring segment with a groove therein to receive an expander spring that presses radially all the exterior circumference of the segment against the wall of a surrounding cylinder and which radial pressure is graduated by the thickness and section of the expander. The present invention thus relates to what is commonly referred to as a wiping ring or piston ring. The segments are manufactured by compression, by means of a die-mold having parts which are partially or totally interchangeable.

The improvements of this invention comprise a die-mold integrated by several interchangeable pieces, and which improvements reflect in the saving of complete die-molds and of the utilities, for the different types, and forms of segments: compressor, scraper, greaser-degreaser.

For the manufacture of the segments, the first operation starts with copper and its alloys in bars, laminating them or drawing them to the most adequate sections and thicknesses as required to use for the succeeding pressure conformation of the segment to its type and form.

In continuation, in the second operation, the appropriate copper section is passed through a machine that cuts longitudinal fragments which are then curved, forming open rings. The third operation is realized in a die-mold integrated by four interchangeable pieces; the upper movable punch-base, the punch-disc with a groove-forming projection the ring on the base, and the lower base. These interchangeable pieces allow the formation of several variations of grooves and engravings, and of desired dimensions.

To form an expander ring segment, the copper ring is placed in the appropriate die-mold for th type and form to be formed, and the assembled ring with the die-mold is situated in a press to effect the pressing by punch blows, (consituted by the upper movable punch-base and the punch disc), that in its succeeding return extracts the segment from the cavity of the mold, being held to the punch-disc and against the protruding projection of same, from where the segment is removed by hand. The segment may be stamped with references such as commercial name, locality, number and other useful details which are all stamped in a single operation in the segment on the lower circumferential frontal part of the groove.

The interchangeability of the die-mold parts permits a very extensive range in terms of characteristics and dimensions of the ring segments being made.

The punch-disc realizes three operations simultaneously; it forms the groove and the stamped reference engravings during the descent of the punch, while the third operation consists in the extraction of the ring segment from the interior of the mold as the punch-disc is moved upwardly and the press is stopped.

The segments after being formed, are susceptible to being machined on their two parallel planes or end faces in a machine with a magnetic face-plate or electromagnet. For this purpose an open steel ring of adequate section is placed in the inner groove of the segment, arranging them individually, also in series, in position on the magnetic face-plate or electromagnet. In the center of the segment-ring of steel there is positioned a ferric flat disc with a circular bevel, which disc is of less thickness than the height of the segment and has a diameter so that it is supported on the steel ring so that when the electromagnet is actuated, the ferric disc steel ring receive the attraction of the magnetic plate or electromagnet, the whole becoming held together.

After rectifying or machining one parallel plane, the other parallel plane is rectified or machined in a similar manner to cause the segment to have the thickness required.

The rectification may be performed be eliminating the open steel ring, but by placing the ferric metal disc in the center of the segment with the disc being supported in the interior groove of the segment.

In order to facilitate the description, two sheets of drawings accompanies this memorandum, in which one case of realization has been represented that is cited as an example.

In the drawings:

FIGS. 8 to 11 show the possible sections of the expansion springs, circumferentially, interchangeable and graduateable by their thickness.

FIGS. 12 and 13 show respectively in section and plan, a mold base, whose upper compressor border has cavities with the object of compressing a non-ferric ring of greaser-degreaser type, that has canals in one of its bases for the outlet of excess oil.

FIG. 14 represents a section of a segment of the greaser-degreaser type ring with the expander spring housed in the groove.

FIG. 15 represents a detail in section of a segment ring prepared for machining of its axial end planes.

FIG. 16 represents a detail in section of a segment ring provided with an expander spring therein and prepared for machining of its axial end planes.

Figure 1:
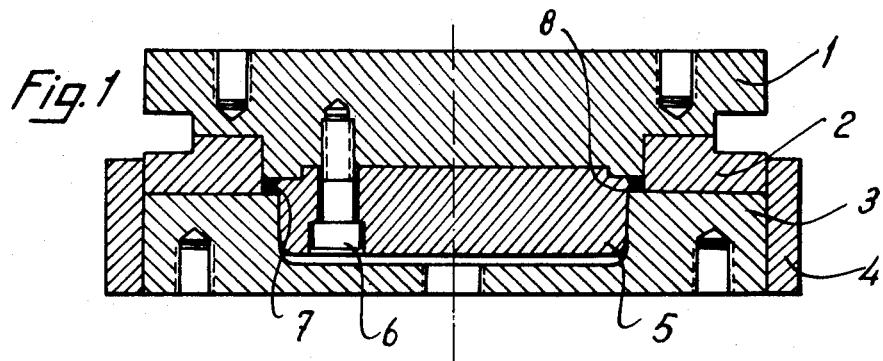
FIG. 1 shows in section the conjoint assembly of a die-mold with one ring segment compressed therebetween.
Figure 2:
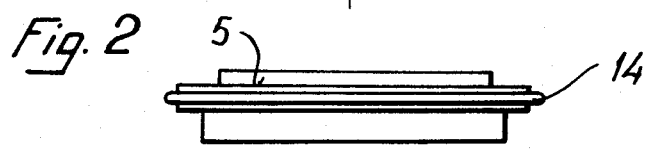
FIGS. 2 to 5 show four variations of discs to form internal grooves, as cavities for housing the respective expansion springs, that may be graduated by thicknesses and sections.
Figure 3:
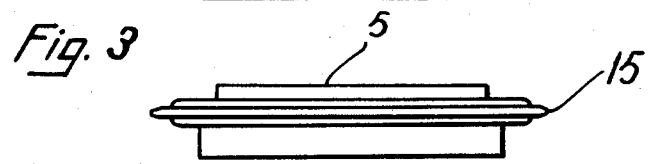
Figure 4:
Figure 5:
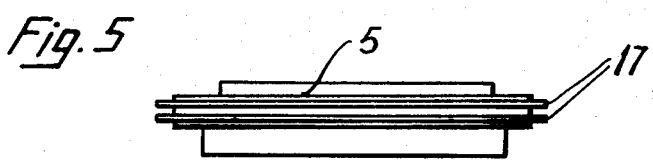
Figures 6, 7:
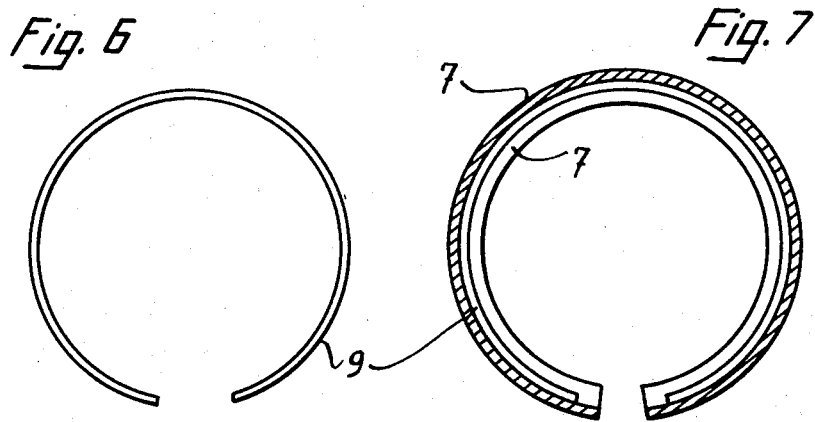
FIG. 6 shows a plan view of the expansion spring.
FIG. 7 shows a plan view in section of a ring segment with the expander spring housed in the groove for circumferential pressure to the segment.

Referring to the figures there illustrated a die assembly having an upper movable punch base 1 which is actuated by a press and coacts with an intermediate ring 2 that adjusts with a centering ring 4 and rests on a lower base 3 which is fixed to the immovable table of the press. A punch-disc 5 is encased within lower base 3 and is fixed by screws 6 to the upper movable punch base 1. The die assembly is used for forming a compressed ringlike segment 7 having an interior groove 8 for receiving therein an expander spring 9 of shaped steel, which spring may have one of many different cross sections such as circular 10, isosceles 11, square 12, and rectangular 13. A projection on the punch-disc 5 forms the inner groove 8 in the segment 7. The projection 14 of FIG. 2 are of a U-shaped form. However, other projection forms can be used. In FIG. 3, the projection 15 forms an isosceles groove. In FIG. 4, the projection 16 forms a square groove. In FIG. 5, the twin projections 17 produce two interior rectangular grooves in the compressed segment 7.

In FIGS. 12 and 13, the lower base has radial cavities 18 formed therearound which, for the segment 7 being compressed, provide canals which are inclined toward the interior to provide better circulation of the excess oil from the greaser-degreaser.

In FIG. 15 is seen a segment 7 which has housed within its groove 8 a ferric disc 19 to be attracted by the magnetic plate or electromagnet of a machine, such as a grinder. In FIG. 16, the ferric disc 19 rests on the steel ring 9. In both cases, it is convenient that the disc 19 have a beveled border, and that its contact surface with the magnetic plate or electromagnet be in alignment with one of the planes or axial end faces of the segment.

This invention, within its specialty may be carried into practice in other forms that differ in detail from the indicated form as an example in the description. It may be therefore constructed in any form and size, with the most adequate materials, all of which shall be comprehended within the spirit of the claims.

I claim:
1. Improvements in the manufacture of a wiping ring structure having a grooved ringlike segment containing therein a split ringlike expander spring, comprising the steps of:
   providing a barlike element of metal having a cross sectional configuration consistent with the form and size of the segment which is to be formed;
   forming a predetermined length of said barlike element into an open or split ringlike member;
   providing a die assembly having first and second relatively movable die sections, one of said die sections being adapted to support the split ringlike member thereon, the other die section having a disclike punch provided with an annular outwardly extending projection for forming an annular groove in said segment;
   positioning said ringlike element on said one die section when said other die section is spaced therefrom;
   pressing said ringlike member between said first and second die sections for forming said segment therebetween with said projection resulting in the formation of an interior annular groove in said segment;
   removing said segment from said die assembly; and
   positioning a split ringlike expander spring within the interior groove of said segment.

2. Improvements according to claim 1, wherein the pressing together of the die sections causes the grooved segment to become attached to the projection formed on said disclike punch, whereby said segment is removed from said die assembly by causing said die sections to be relatively moved away from one another whereby said segment remains attached to the projection associated with said other section, said segment then being expanded to enable removal of same from said projection.

3. Improvements according to claim 1, including the step of providing radially extending channels on one of the die sections in direct communication with the ringlike member as positioned thereon, and pressing said die sections together for forming said segment and for forming channels in one of the surfaces of the segment.

4. Improvements according to claim 1, further including the step of finishing the axial end faces of the segment after removal of same from the die assembly to cause the axial end faces to be planar and parallel, said finishing step including the sub-steps of positioning said segment on a platelike magnetic or electromagnetic support member, and holding said segment securely against said support member by means of a disc of ferrite material positioned in the interior of said segment and having edge portions adapted to engage said segment for holding said segment securely against said support member.

5. Improvements according to claim 4, wherein a ringlike element is disposed in the groove of said segment with said ringlike element projecting radially inwardly beyond the inner edge of said segment, and said disc having the edge thereof disposed in engagement with said ringlike element for holding said segment against said support member.

6. Improvements according to claim 4, wherein said disc has an axial thickness less than the thickness of said segment, and wherein the annular edge of said disc has a beveled surface thereon.

7. Improvements according to claim 1, wherein said one section of said die assembly includes a fixed lower base having a centering ring fixedly secured thereto and coacting with said lower base to define a surface on which the ringlike member can be positioned;
   wherein the other die section includes an upper movable base disposed opposite the lower base and having said disclike punch fixedly secured thereto and projecting downwardly therefrom toward the lower base, said disclike punch being adapted to extend into said centering ring, said lower base and said centering ring being separable and said upper base and said disclike punch being separable to permit the various components of the die assembly to be readily interchanged to permit the size and cross section of the segment and of the groove therein to be readily varied.

8. Improvements according to claim 7, wherein the interior groove formed in said segment has a triangular or rectangular cross section, and wherein the expander spring has a triangular or rectangular cross section, respectively.

* * * * *

UNITED STATES PATENT OFFICE
CERTIFICATE OF CORRECTION

Patent No. 3,758,929    Dated September 18, 1973

Inventor(s) Manuel Punsola Fabregat

It is certified that error appears in the above-identified patent and that said Letters Patent are hereby corrected as shown below:

On the title page, left hand column, between the lines numbered [21] and [52], please insert --[30] Foreign Application Priority Data, Spain, Application No. 378 595, filed April 4, 1970--.

Signed and sealed this 30th day of July 1974.

(SEAL)
Attest:

McCOY M. GIBSON, JR.
Attesting Officer

C. MARSHALL DANN
Commissioner of Patents